Dec. 22, 1964  R. K. SQUIRE  3,162,404
GROUND HANDLING SYSTEM FOR AIRCRAFT
Filed April 2, 1962  3 Sheets-Sheet 1

INVENTOR.
ROBERT K. SQUIRE
BY
ATTORNEYS

Dec. 22, 1964 R. K. SQUIRE 3,162,404
GROUND HANDLING SYSTEM FOR AIRCRAFT
Filed April 2, 1962 3 Sheets-Sheet 2
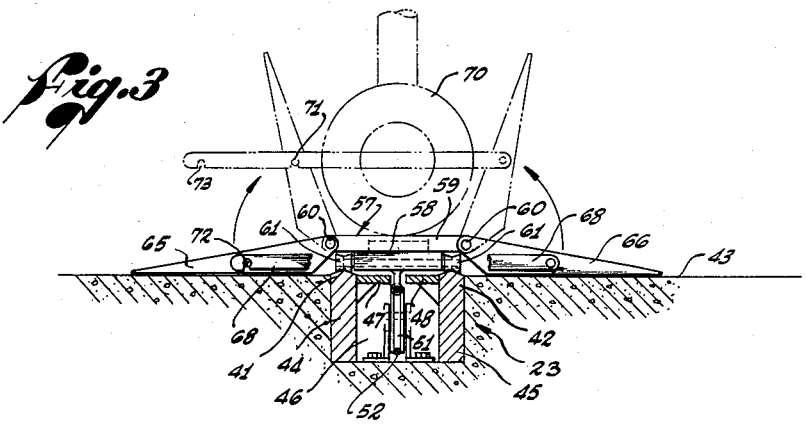
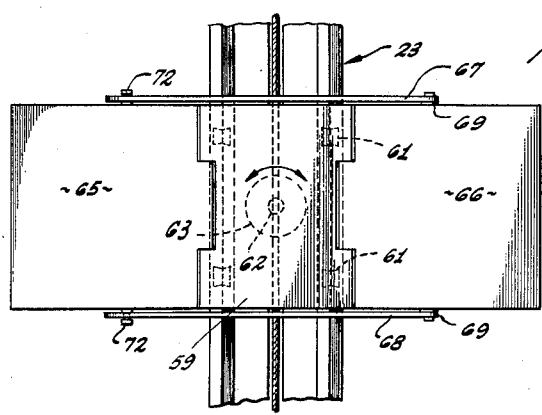
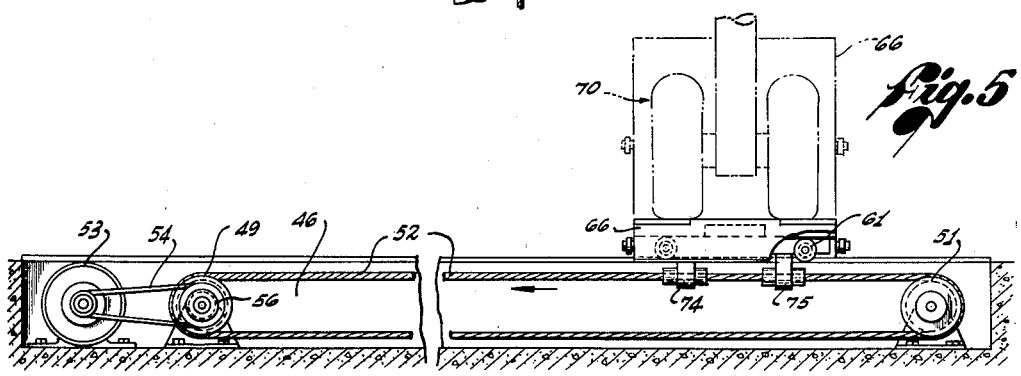
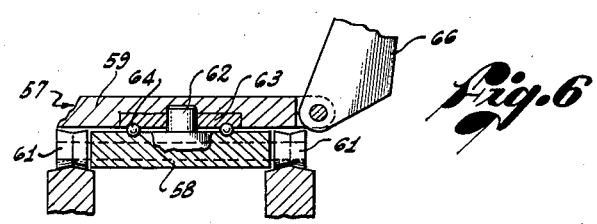
INVENTOR.
ROBERT K. SQUIRE
BY *Zulweder Mattingly & Huntley*
ATTORNEYS

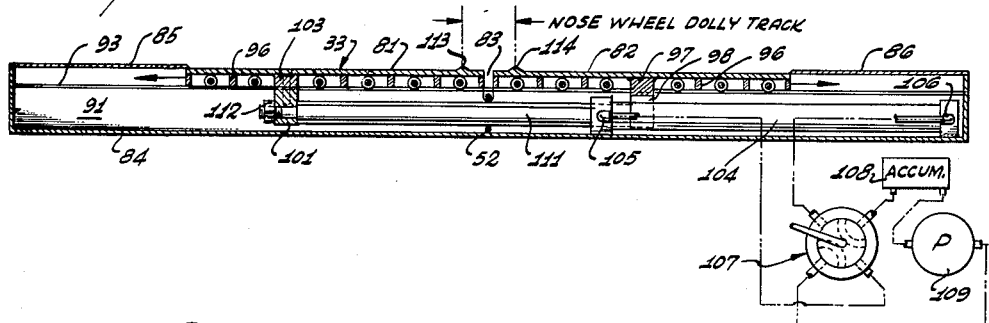

United States Patent Office 3,162,404
Patented Dec. 22, 1964

3,162,404
GROUND HANDLING SYSTEM FOR AIRCRAFT
Robert K. Squire, Los Angeles, Calif., assignor to Superior Scaffold Co., Torrance, Calif., a corporation of California
Filed Apr. 2, 1962, Ser. No. 184,315
11 Claims. (Cl. 244—114)

The present invention relates generally to ground handling means for aircraft, and more particularly to a method and system for moving an aircraft to an indexed position for loading, unloading and service, or for inspection and repair.

According to existing ground handling systems for aircraft, the aircraft may be taxied into loading and servicing position under its own power, or an auxiliary tractor may be connected to the aircraft for towing it into position. With both of these operations the final position of the aircraft becomes uncertain and it may not be properly indexed with respect to permanent servicing installations or permanent passenger and freight ramps and platforms. Also in such handling systems, considerable space must be provided for manipulating the aircraft and for auxiliary ground equipment, including servicing and towing trucks and passenger accommodations.

The ground handling system according to the present invention permits the establishment of permanent installations for loading, servicing, inspection, etc.; provides for the positive positioning of the aircraft at these permanent installations by one man operation; eliminates all auxiliary ground servicing equipment in the form of separate trucks; and facilitates the bringing of the aircraft into a covered area for the protection of passengers and personnel from the weather.

In a preferred embodiment of the invention, the aircraft is taxied under its own power to the end of a main conveyor where it is connected, preferably adjacent its front end, to a towing means movable by the conveyor to pull the aircraft toward its final position indexed with the permanent installations with which it is to be associated. Intermediate the end of the conveyor is disposed a second conveyor or movable platform, preferably disposed transversely of the first conveyor, which is used to shift the main landing wheels of the aircraft to align the axis of the aircraft fuselage with the main conveyor so that it will come head on into its indexed position. These pulling and shifting operations on the aircraft may be effected by a single ground man, if desired, and the alignment of the axis of the aircraft fuselage with the main conveyor will insure the proper indexing of the aircraft with the permanent installations at its final position. Operation in reverse will effect tracking of the aircraft back into taxiing position to either side of the main conveyor, as dictated by the direction of shifting of the main landing wheels of the aircraft.

It is, therefore, an object of the present invention to provide improved ground handling means for aircraft which will insure the positive positioning of the aircraft in a desired indexed position.

Another object of this invention is the provision of improved ground handling means for aircraft permitting the complete positioning of the aircraft in a desired indexed position by one man operation.

A further object of this invention is the provision of improved ground handling means for aircraft which eliminates the need for auxiliary mobile ground handling equipment in the form of trucks for towing or servicing the aircraft.

Yet another object of this invention is the provision of improved ground handling means for aircraft providing for the shifting of an end thereof transversely to the axis of the fuselage so as to align the axis with the direction of travel of the aircraft and insure head on movement into its final indexed position.

A still further object of this invention is the provision of improved ground handling means for moving an aircraft to a taxiing position by a straight-line movement of its nose, with the main landing wheels shifted and tracking to turn the tail of the aircraft to face the nose at an angle to its direction of movement.

These and other objects and features of the invention will be readily apparent to those skilled in the art from the following specification and the appended drawings illustrating a presently preferred embodiment of the invention, in which:

FIGURE 3 is a sectional view through the main conveyor according to the present invention adjacent to the taxiway end thereof and showing the nose wheel receiving dolly;

FIGURE 4 is a plan view of the conveyor and dolly of FIGURE 3;

FIGURE 5 is a longitudinal sectional view through the conveyor;

FIGURE 6 is an enlarged detail sectional view through the dolly;

FIGURE 7 is a longitudinal sectional view through the transverse shifting platform;

FIGURE 8 is a plan view of the shifting platform; and

FIGURE 9 is a transverse sectional view through the shifting platform on the line 9—9 of FIGURE 8.

Figure 1:
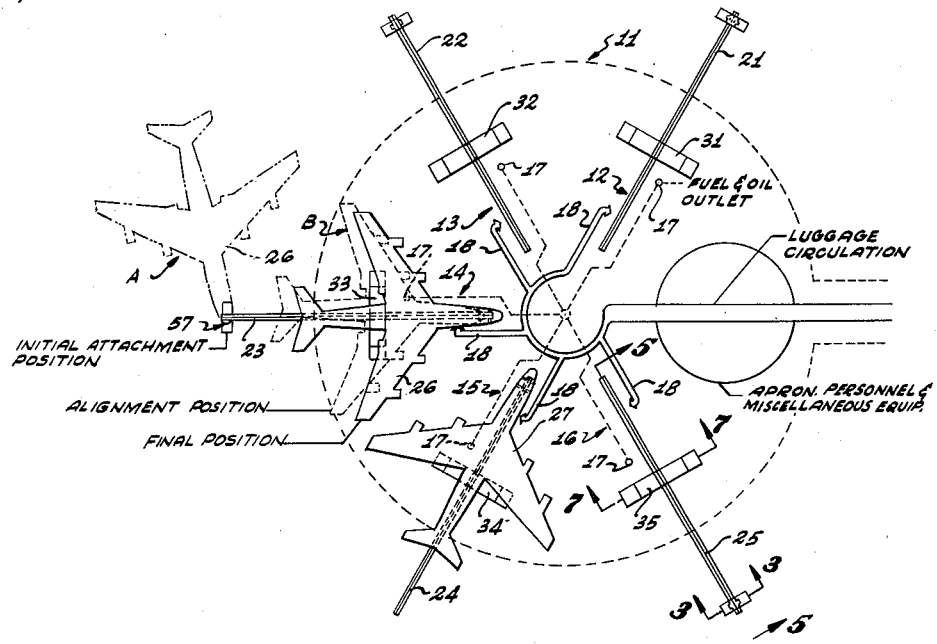
FIGURE 1 is a diagrammatic plan view of an airport system having a plurality of aircraft staging positions employing aircraft ground handling means according to the present invention.
Figure 2:
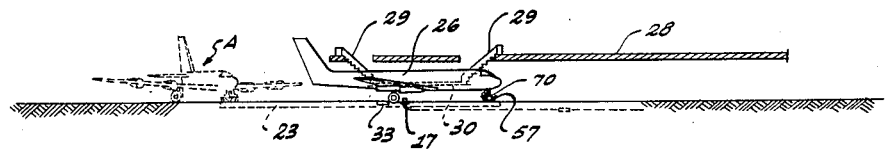
FIGURE 2 is a partial side elevational view of the airport of FIGURE 1 showing the passenger level above the aircraft level.

The airport system illustrated in FIGURES 1 and 2 of the drawings comprises a generally circular staging area 11 providing five staging or indexed positions for aircraft at 12 through 16. At each of these staging positions there are provided permanent installations at 17 for fuel and oil servicing, and at 18 for baggage handling. Aligned with the staging positions 12 through 16 are radially extending conveyors 21 through 25 for moving the aircraft into and out of indexed relation at the staging positions. The platforms for shifting the tails of the aircraft into alignment with the conveyors 21-25 are shown at 31 through 35, respectively, the shifting platform 31 being associated with the conveyor 21, the platform 32 with the conveyor 22, and so on. Aircraft at 26 and 27 are shown in indexed position at the staging positions 14 and 15. In its phantom, dotted line and full line positions, the aircraft 26 illustrates successive steps in indexing the aircraft with the permanent installations at the staging station by which it is drawn from its taxiway to its final loading and servicing position.

In the diagrammatic elevational view of FIGURE 2, in addition to the ground or aircraft level shown in FIGURE 1, there is shown a platform level 28 thereabove from which stairways 29 lead to a passenger loading platform 30 at the side of the aircraft and substantially at door level, the stairs and platform being preferably suspended from above to permit free passage of the aircraft wing therebeneath.

The radial conveyors and transverse shifting platforms being identical for the various staging positions, those operating on the aircraft 26 have been selected for specific illustration in FIGURES 3 through 9. The main conveyor 23 is shown in FIGURES 3-6, inclusive, as including a trackway formed by a pair of tracks 41 and 42 disposed slightly above the ground lever 43. The tracks 41 and 42 are disposed at the upper edges of elongated vertical plates 44 and 45, respectively, forming the side walls of a compartment 46 embedded below ground level within the floor of the staging area. The top of the chamber 46 is closed, except for a central slot, by a pair of spaced apart cover plates 47 and 48 mounted on the side walls 44 and 45.

At opposite ends of the chamber 46 are mounted pulley or sprocket wheels 49 and 51 receiving an endless cable or chain 52 thereover, extending longitudinally of the chamber 46. An electric motor 53 drives the wheel 49 through a suitable belt or chain 54 connected between the motor pulley or sprocket 55 and a pulley or sprocket 56 connected positively to the wheel 49 to rotate therewith. The motor 53 is a reversible motor to drive the cable 52 in opposite directions.

Upon the tracks 41 and 42 of the conveyor 23 is supported a dolly 57 having superposed, relatively rotatable platforms 58 and 59 and wheels 61 on the platform 58 riding along the tracks 41 and 42. As shown in FIGURE 6, the platform 58 of the dolly 57 has a post 62 extending upwardly therefrom received within a plate 63 inset in the platform 59. Ball bearings 64 are placed between the plate 63 and the platform 58 so that the platform 59 may rotate freely about the post 62 relative to the platform 58. At opposite sides of the platform 59 ramp plates 65 and 66 are pivotally mounted as at 60. In connecting the aircraft to the conveyor, the nose wheel may be rolled up either ramp 65, 66 into position on the platform 59. Thereafter the rams 65 and 66 may be raised into the phantom position of FIGURE 3 to lock the nose wheel in place. To hold the ramps 65 and 66 upwardly and prevent sidewise slideoff of the nose wheel, a pair of locking arms 67 and 68 are pivotally mounted on the ramp 66 by pins 69 and have notches 71 engageable with pins 72 on the ramp 65 to lock the ramps in their upper positions, as shown in phantom in FIGURE 3. Additional notches 73 are provided adjacent the ends of the arms 67 and 68 to engage the pins 72 when the ramps are down, as in the full line position of FIGURE 3.

A pair of cable grips 74 and 75 are rigidly connected to and depend from the platform 58 of the dolly 57, and clamp onto the cable 52 in fixed position, so that the dolly 57 will be moved longitudinally of the conveyor 23 as the cable moves, to move the nose wheel of the aircraft therewith, the nose wheel being located on the platform 59 between the ramps 65 and 66, as shown in phantom at 70 in FIGURE 3.

The shifting platform for moving the tail of the aircraft into and out of alignment with the conveyor 23 is shown in FIGURES 7 through 9. The shifting platform 33 is made up of a pair of flat plates 81 and 82, spaced apart at 83 to permit passage of the cable grips 74, 75 therebetween. The plates 81 and 82 reciprocate within and adjacent to the top of a box-like compartment 84 embedded in the floor of the staging area with the axis of the box disposed transversely of the conveyor 23, substantially at right angles thereto, and with the conveyor disposed substantially centrally of the box chamber. The compartment 84 is entirely enclosed on the sides, ends and bottom and has partial top covers 85 and 86 adjacent to its ends which are disposed at ground level and beneath which the plates 81 and 82 ride, as shown in FIGURE 7.

Upon the under surface of each of the plates 81 and 82, adjacent the opposite sides thereof, are disposed a pair of longitudinally extending reinforcing strips 87 and 88 between which are rotatably mounted supporting rollers 89. Within the compartment 84 are disposed a pair of longitudinally extending vertical plates 91 and 92 providing tracks 93 and 94 at their upper ends, upon which ride the rollers 89 to support the plates 81 and 82 for movement in opposite directions transversely of the conveyor 23. Extending transversely of the plates 81 and 82 are a plurality of reinforcing strips 95. Between the strips 87, 88 and between the rollers 89 are reinforcing blocks 96. All of the strips 87, 88 and 95, and reinforcing blocks 96 are preferably securely welded to the respective plates 81 and 82.

Rigidly secured to the under surface of the plate 82, as by welding, is a supporting block 97 having integral therewith, or integrally connected thereto, a pair of depending supporting blocks 98 in each of which is secured, as by welding, one end of a connecting bar 99, the bars 99 being disposed in a spaced apart pair as shown in FIGURES 8 and 9. The opposite ends of the bars 99 are rigidly secured, as by welding, in a common block 101 supported, as by bolts 102, to a transverse supporting bar 103 rigidly secured, as by welding, to the under surface of the plate 81. By means of the bars 99 secured to the plates 81 and 82 through the blocks 97, 103 and 98, respectively, the plates are rigidly secured together for common movement as a unit.

A hydraulic cylinder 104 is mounted in the chamber 84 and has inlet-outlet connections 105 and 106, adjacent to its opposite ends, leading to a controlling valve 107. The valve 107 is connected to an accumulator 108 for hydraulic fluid under pressure supplied by a serially connected pump 109. A suitable piston, not shown, within the cylinder 104 is connected to a piston rod 111 and the free end of the piston rod is connected to the block 101 carrying the connecting bars 99, being retained therein by a suitable nut 112. In the position of FIGURES 7 and 8, the piston within the cylinder 104 is substantially at a mid point therein so that it may move substantially the same distance in opposite directions to shift the platform 33 either way.

Upon the top surfaces of the plates 81 and 82, at opposite sides of the space 83 therebetween, are tracks 113 and 114 which align, respectively, with the tracks 41 and 42 on the conveyor 23 when the platform 33 is in its mid position, as shown in FIGURE 8. As shown in FIGURE 7, the cable 52 passes freely through clearance openings through the plates 91, 92, the openings for the upper leg of the cable loop being provided by notches which lower the cable below the level of the tracks 93, 94 but from which it may be lifted by the cable grips 74, 75 as the dolly 57 passes over the shifting platform 33.

The operation of the conveyor of FIGURES 3 through 6 and the shifting platform of FIGURES 7 through 9 will be described with respect to the progressive phantom, dotted line and full line positions of the aircraft 26 of FIGURE 1. To move an aircraft from its taxiway into its indexed staging position within the airport, the dolly 57 is disposed at the end of the conveyor 23 remote from the airport, and the ramps 65, 66 are lowered to the loading position of FIGURES 3 and 4. The aircraft is taxied under its own power from the runway, through the taxiway, into phantom position A with the nose wheel 70 rolled up one of the ramps 65, 66 onto the platform 59 of the dolly, in the position shown in phantom in FIGURES 3 and 5. With the nose wheel 70 in position, the ramps 65 and 66 are raised upwardly into the phantom positions of FIGURES 3 and 5, and locked therein by the engagement of the notches 71 of the arms 67, 68 with the pins 72. This locks the nose wheel securely in position on the dolly platform 59. Thereafter, the motor 53 is energized by suitable controls, not shown, to effect movement of the cable 52 and of the dolly 57 therewith, inwardly toward the right as viewed in FIGURE 1.

This movement continues, with the main landing wheels of the plane tracking along behind the nose in a curved path, until the aircraft assumes the dotted line position B, a short distance before its final indexed position. In position B the main landing wheels of the plane are disposed on the platform 33, but the tail of the plane is offset from the conveyor 23. The motor 53 is now stopped, so that the aircraft is stationary in position B, and the valve 107 is manipulated to feed hydraulic pressure to the appropriate end of the cylinder 104 to move the piston therein in the direction to shift the platform 33 to bring the tail of the aircraft and the axis of the fuselage into alignment with the conveyor 23. Thereafter the motor 53 is again energized and the aircraft moves head on with its fuselage axis aligned with the conveyor, into the final staging position, where the motor 53 is again stopped.

In this staging position baggage is unloaded to the carrier system 18 with which the aircraft is indexed, and the carrier moves the baggage automatically to its dispersal point. Passengers leave the aircraft directly to the ramp 30 and up the stairways 29 to the passenger level 28. Servicing can be effected from the permanent installations 17 for fuel and oil.

After servicing and reloading, the aircraft is removed to its taxiway by a reverse operation to that previously described for indexing it in the staging position. The platform 33 is first returned to its mid position. The motor 53 is then energized to rotate in the reverse direction to move the cable 52 and the dolly 57 therewith in the reverse direction, the aircraft moving straight back in this initial movement with the axis of the fuselage aligned with the conveyor 23. When the main landing wheels of the aircraft roll onto the shifting platform 33, the motor 53 is stopped to stop the aircraft, and the valve 107 is manipulated to shift the platform 33 and the tail of the aircraft to either side of the conveyor 23, depending on the direction in which the aircraft is to face. If the aircraft is desired to face in the same direction as position A, the tail of the aircraft will be shifted above the conveyor 23, as viewed in FIGURE 1, to position B; and, if in the reverse direction, would be shifted below the conveyor 23.

After this shifting of the aircraft tail, the motor 53 is re-energized in the same reverse direction, and the nose of the aircraft continues outwardly along the conveyor 23. In this movement the main landing wheels of the aircraft track in a curve, the reverse of the entering movement, to reposition the aircraft in position A when the dolly 57 reaches the end of the conveyor 23. The motor is stopped in this position and the ramps 65 and 66 are lowered. The engines of the aircraft may now be started and the aircraft taxied to its takeoff runway under its own power. If the aircraft is to return to position A, the platform 33 need not be moved until the main landing wheels are located thereon, and after shifting, the tracks 113, 114 will be aligned with the tracks 41 and 42 for passage of the dolly 57 thereover. If shifted out of mid position, as first described, the platform 33 must be returned thereto to align the tracks, after the wheels move therefrom.

It will be noted that as the aircraft is moved along the conveyor 23, the angle its axis makes with the conveyor is continually changing, and in this movement the dolly platform 59 is rotated relative to the platform 58 which maintains its alignment parallel to the tracks 41, 42. Instead of the dolly 57 engaging the nose wheel of the aircraft, it may be towed by means of a tow bar connected to the aircraft at either end, for example, to the nose wheel supports.

While the conveyors 21 through 25 have been shown in FIGURE 1 as extending radially with respect to a circular airport, it will be understood that the airport may be of elongated configuration and the conveyors be disposed parallel to each other and, if desired, directed alternately so that the aircraft may enter beneath the airport in alternate directions, from opposite sides thereof.

It will be obvious that the ground handling means according to the present invention may be used with all types of aircraft, military and commercial, and is equally applicable to the pulling of the aircraft into hangars and into inspection and repair areas where they may likewise be positively indexed with permanent repairing and inspection facilities. Such facilities may be built into service buildings at desired working levels, and may include ramps and working platforms for the wings and tail fin of the aircraft.

It will be seen that with proper location of the controls for the motor 53 and of the valve 107, a single workman can easily move the aircraft from its taxiway into its final indexed staging position without other guidance or assistance, and that this indexing with permanent installations for loading, unloading and servicing will eliminate many of the ground crew now necessary to effect these services on the plane, and will further cut down the time consumed in such servicing, since the facilities can be set up and ready to go as soon as the aircraft pulls in.

While certain preferred embodiments of the invention have been specifically illustrated and described, it will be understood that the invention is not limited thereto, as many variations will be apparent to those skilled in the art, and the invention is to be given its broadest interpretation within the terms of the following claims.

I claim:

1. Ground handling means for moving an aircraft into an indexed staging position, comprising: a conveyor leading into said staging position; means on said conveyor connecting to said aircraft adjacent one end thereof so that said end of said aircraft moves with said conveyor; means providing a shifting platform disposed transversely of said conveyor intermediate the ends thereof in position to be engaged by the main landing wheels of the aircraft; means for moving said conveyor to effect movement of said one end of the aircraft therealong with the main landing wheels tracking thereafter; and means for shifting said platform when said main landing wheels are seated thereon so as to shift the opposite end of the aircraft and the axis of the fuselage into alignment with said conveyor, whereby movement of said conveyor after operation of said shifting platform effects head on movement of the aircraft into its final staging position.

2. Ground handling means for moving an aircraft into an indexed staging position, comprising: a straight-line conveyor leading into said staging position; a dolly on said conveyor and movable therealong; means for locking the nose wheel of an aircraft on said dolly to effect movement of the front end of said aircraft along said conveyor with the main landing wheels tracking thereafter; means providing a shifting platform disposed transversely of said conveyor intermediate the ends thereof in position to be engaged by the main landing wheels of the aircraft; means for moving said dolly to effect movement of said nose wheel along the conveyor; and means for shifting said platform when said main landing wheels are seated thereon so as to shift the tail of the aircraft to align the axis of the fuselage with the conveyor, whereby movement of said dolly after operating of the shifting platform effects head on movement of the aircraft into its final staging position.

3. Ground handling means for aircraft as defined in claim 2, in which said dolly includes at least one side ramp up which the aircraft nose wheel rides onto the dolly platform; and means mounting the ramp for movement into a position retaining the nose wheel on the platform.

4. Ground handling means for aircraft as defined in claim 2, in which said conveyor includes a trackway along which said dolly rolls and an endless cable connected to the dolly for effecting movement thereof in opposite directions.

5. Ground handling means for moving an aircraft from a taxi position into an indexed staging position, comprising: straight-line conveyor means movable in a continuous loop between said taxi position and said staging position; means carried by said conveyor means for connecting to the aircraft adjacent to one end thereof so that said end moves with the conveyor with the main landing wheels of the aircraft tracking thereafter; means for effecting movement of said conveyor means in opposite directions to effect movement of said aircraft end therewith; means providing a shifting platform disposed transversely of said conveyor means and intermediate the ends thereof in position to be engaged by the main landing wheels of the aircraft; and means for shifting said platform when said main landing wheels are seated thereon so as to shift the opposite end of the aircraft and the axis of the fuselage into alignment with said conveyor means, whereby movement of said conveyor means after operation of said shifting platform effects head on movement of the aircraft into its final staging position.

6. Ground handling means for aircraft as defined in claim 4, in which said shifting platform includes a trackway thereon and movable therewith to align the platform trackway with the conveyor trackway to provide for passage of the dolly thereover.

7. Ground handling means for moving an aircraft into an indexed staging position, comprising: a conveyor leading into said staging position; means on said conveyor connecting to an aircraft adjacent one end thereof so that said end of said aircraft moves with said conveyor; means providing a shifting platform disposed transversely of said conveyor intermediate the ends thereof in position to be engaged by the main landing wheels of the aircraft; wheel supports beneath said platform; tracks disposed transversely of said conveyor along which said wheel supports run to shift said platform; means for moving said conveyor to effect movement of said one end of the aircraft therealong with the main landing wheels tracking thereafter; and means for shifting said platform when said main landing wheels are seated thereon so as to shift the opposite end of the aircraft and the axis of the fuselage into alignment with said conveyor, whereby movement of said conveyor after operation of said shifting platform effects head on movement of the aircraft into its final staging position.

8. Ground handling means for aircraft as defined in claim 7, including a hydraulic cylinder and a controlled source of hydraulic pressure therefor for effecting shifting of said platform in opposite directions.

9. Ground handling means for moving an aircraft from a parked position into a definite indexed position, comprising: a first conveying means extending substantially between said positions; a second conveying means located intermediate the ends of said first conveying means and transversely thereof; means on said first conveying means engaging one end of an aircraft for effecting movement thereof with the conveying means; means on the second conveying means for engaging the main landing wheels of the aircraft after the aircraft has been moved a predetermined distance along the first conveying means; and means for moving said second conveying means to shift the opposite ends of the aircraft to align the axis of the aircraft fuselage with said first conveying means so that said first conveying means thereafter moves said aircraft head on into its final indexed position.

10. Ground handling means for aircraft as defined in claim 9, in which said first conveying means includes an endless loop; means carried by said loop for engaging the nose wheel of the aircraft; and means for effecting movement of the loop in opposite directions to effect movement of said nose wheel therewith.

11. Ground handling means for aircraft as defined in claim 9, in which said second conveying means includes a shiftable platform upon which the main landing wheels of the aircraft roll in tracking after the moving end; and means for effecting shifting of the platform and of the main landing wheels therewith to align the axis of the aircraft fuselage with the first conveying means.

References Cited in the file of this patent

UNITED STATES PATENTS 2,855,165    Beauvais _____ Oct. 7, 1958

FOREIGN PATENTS 597,806    Great Britain _____ Feb. 4, 1948

OTHER REFERENCES

Aviation Week, p. 35, Dec. 29, 1958.